United States Patent
Sato et al.

(10) Patent No.: US 7,019,064 B2
(45) Date of Patent: Mar. 28, 2006

(54) POLYAMIDE RESIN COMPOSITION

(75) Inventors: Kazunobu Sato, Kanagawa (JP); Jun Mitadera, Kanagawa (JP)

(73) Assignee: Mitsubishi Gas Chemical Company, Inc., Tokyo (JP)

(*) Notice: Subject to any disclaimer, the term of this patent is extended or adjusted under 35 U.S.C. 154(b) by 274 days.

(21) Appl. No.: 10/272,385

(22) Filed: Oct. 17, 2002

(65) Prior Publication Data

US 2003/0114591 A1 Jun. 19, 2003

(30) Foreign Application Priority Data

Oct. 31, 2001 (JP) ............................. 2001-334664

(51) Int. Cl.
  *C08K 3/34* (2006.01)
  *C08K 9/04* (2006.01)
(52) U.S. Cl. .................. 524/445; 524/186; 524/447; 523/210
(58) Field of Classification Search ............. 524/447, 524/445, 186; 523/216
  See application file for complete search history.

(56) References Cited

U.S. PATENT DOCUMENTS

| | | | | |
|---|---|---|---|---|
| 5,340,884 A | * | 8/1994 | Mills et al. | 525/420 |
| 6,255,378 B1 | * | 7/2001 | Fujimoto et al. | 524/449 |
| 6,313,209 B1 | * | 11/2001 | Urabe et al. | 524/447 |
| 6,552,113 B1 | * | 4/2003 | Bagrodia et al. | 524/445 |

FOREIGN PATENT DOCUMENTS

| | | |
|---|---|---|
| EP | 1156073 | 11/2001 |
| WO | WO01/04197 | 1/2001 |

* cited by examiner

*Primary Examiner*—Tae H. Yoon
(74) *Attorney, Agent, or Firm*—Antonelli, Terry, Stout and Kraus, LLP.

(57) ABSTRACT

The polyamide resin composition of the present invention comprises a polyamide resin and a smectite treated with an organic swelling agent. The polyamide resin is produced by the polycondensation of a diamine component containing 70 mol % or more of m-xylylenediamine and a dicarboxylic acid component containing 70 mol % or more of a straight-chain, aliphatic α,ω-dicarboxylic acid having 4 to 20 carbon atoms, and meets requirement of (1) a terminal amino concentration of less than 60 μeq/g and/or (2) a reaction molar ratio of less than 1.0 when defined by a molar ratio of reacted diamine to reacted dicarboxylic acid.

5 Claims, No Drawings

POLYAMIDE RESIN COMPOSITION

BACKGROUND OF THE INVENTION

1. Field of the Invention

The present invention relates to a polyamide resin composition, more particularly, to a polyamide resin composition which is suitable as packaging materials for foods, beverages, medicines, electric parts, etc. because of its excellent clarity, appearance, and gas barrier properties.

2. Description of the Prior Art

Polyamide resin has been widely used as the material for injection-molding automotive parts, electric parts, electronic parts, etc. because of its excellent mechanical properties. Its application field extends to packaging materials for foods, beverages, medicines, electric parts, etc. Of various polyamide resins, a m-xylene group-containing polyamide prepared by the polycondensation of m-xylylenediamine and an aliphatic dicarboxylic acid, particularly, polyamide MXD6 prepared from m-xylylenediamine and adipic acid is utilized as a gas-barrier material for manufacturing a shaped article such as film and bottle because of its low permeability against gaseous substance such as oxygen and carbon dioxide. Recently, there is an increasing demand for a gas-barrier package capable of storing foods, beverages, etc. for a long term without detracting their freshness. This in turn increases the demand for improvement of the gas-barrier properties much more.

As a method for improving the gas-barrier properties of polyamide resin, Japanese Patent Application Laid-Open No. 2-69562 discloses to incorporate a layered silicate into a polyamide resin. In the proposed method, the layered silicate can be uniformly dispersed, for example, in nylon 6 resin to improve the mechanical properties and the gas-barrier properties. This method, however, requires a particular production method and apparatus and can be applied to a limited resin such as a polyamide resin derived from a lactam monomer. Therefore, the method cannot be applied to polyamide MXD6 obtained by the polycondensation of a xylylenediamine monomer and an aliphatic dicarboxylic acid monomer.

Japanese Patent Application Laid-Open Nos. 2-305828 and 8-53572 disclose to melt-knead a polyamide resin and the layered silicate in an extruder. The proposed methods can disperse the layered silicate into the polyamide resin to some extent to improve the gas-barrier properties of the resulting shaped article such as film. However, the dispersibility of the layered silicate becomes insufficient in some cases to make the improvement in the gas-barrier properties insufficient. In addition, the methods likely to form aggregates and gel-like particles and the resulting shaped article is poor in clarity due to its high haze, thereby deteriorating the productivity and the product value.

SUMMARY OF THE INVENTION

An object of the present invention is to provide a polyamide resin composition that is excellent and stable in the properties required for packaging materials such as appearance (clarity, low aggregate content) and gas-barrier properties.

As a result of intensive study to attain the above object, the inventors have found that the problems in the prior art can be solved by melt-kneading a m-xylene group-containing polyamide having specific properties and a smectite treated with an organic swelling agent in a limited ratio. The present invention has been accomplished based on this finding.

Thus, the present invention relates to a polyamide resin composition comprising (A) 92 to 99.5 parts by weight of a polyamide resin produced by the polycondensation of a diamine component containing 70 mol % or more of m-xylylenediamine and a dicarboxylic acid component containing 70 mol % or more of a straight-chain, aliphatic $\alpha,\omega$-dicarboxylic acid having 4 to 20 carbon atoms and (B) 8 to 0.5 part by weight of a smectite treated with an organic swelling agent, the polyamide resin A meeting the requirement of (1) a terminal amino concentration of less than 60 µeq/g and/or (2) a reaction molar ratio of less than 1.0 when defined by a molar ratio of reacted diamine to reacted dicarboxylic acid.

PREFERRED EMBODIMENTS OF THE INVENTION

The polyamide resin A used in the present invention is a m-xylene group-containing polyamide resin produced by the polycondensation of a diamine component comprising 70 mol % or more of m-xylylenediamine and a dicarboxylic acid component comprising 70 mol % or more of a straight-chain, aliphatic $\alpha,\omega$-dicarboxylic acid having 4 to 20 carbon atoms.

Examples of diamines other than m-xylylenediamine include aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethylhexamethylenediamine, and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and aromatic diamines such as bis(4-aminophenol)ether, p-phenylenediamine, p-xylylenediamine, and bis(aminomethyl)naphthalene.

Examples of the straight-chain, aliphatic $\alpha,\omega$-dicarboxylic acid having 4 to 20 carbon atoms include succinic acid, glutaric acid, pimelic acid, suberic acid, azelaic acid, adipic acid, sebacic acid, undecanedioic acid, and dodecanedioic acid. Of these dicarboxylic acids, preferred is adipic acid.

In addition to the above straight-chain, aliphatic $\alpha,\omega$-dicarboxylic acid, an aromatic dicarboxylic acid such as terephthalic acid, isophthalic acid and 2,6-naphthalenedicarboxylic acid can be used as the dicarboxylic acid component.

The polyamide resin A can be produced by any known methods and under any known polymerization conditions without any specific limitation.

The final product such as films, sheets and hollow containers which is made of the polyamide resin produced from the above starting materials is excellent in properties such as barrier properties against gaseous substances such as oxygen and carbon dioxide. Among such polyamide resins, a polyamide resin produced by the polycondensation of monomers mainly comprising m-xylylenediamine and adipic acid is particularly preferable because of its excellent barrier properties against gaseous substances such as oxygen and carbon dioxide.

The terminal amino concentration of the polyamide resin A is less than 60 µeq/g, preferably not less than 5 µeq/g and less than 60 µeq/g, and more preferably 5 to 50 µeq/g. A shaped article, such as film, of a polyamide resin composition comprising a polyamide resin having a terminal amino concentration of 60 µeq/g or more and a smectite shows an increased haze value to greatly deteriorate the commercial value. In the present invention, the resin composition is prepared by melt-kneading a smectite into a polyamide resin having a limited terminal amino concentration less than a specific value. The shaped articles produced from such a resin composition has a stable clarity because the increase of haze value is suppressed, thereby increasing the commercial values of products.

The reaction molar ratio of the polyamide resin is preferably less than 1.0, more preferably 0.999 to 0.990, and still more preferably 0.998 to 0.992, when defined as a molar ratio of reacted diamine to reacted dicarboxylic acid. When the molar ratio is 0.999 or less, the increase of haze value is suppressed and a stable clarify can be attained. In addition, the gel formation during the extrusion process can be avoided. A reaction molar ratio less than 0.990 is unfavorable because insufficient dispersion of smectite is likely to occur because of a low viscosity of polyamide resin, and disadvantages such as draw down and uneven thickness are caused during the forming process into film, bottle, etc.

The reaction molar ratio (r) is calculated from the following equation:

$$r=(1-cN-b(C-N))/(1-cC+a(C-N))$$

wherein
a: $M_1/2$,
b: $M_2/2$,
c: 18.015,
$M_1$: molecular weight of diamine (g/mol),
$M_2$: molecular weight of dicarboxylic acid (g/mol),
N: terminal amino concentration (eq/g), and
C: terminal carboxyl concentration (eq/g).

The relative viscosity of the polyamide resin A is 1.8 to 3.9, preferably 2.4 to 3.7, and more preferably 2.5 to 3.7 when measured at 25° C. on a 1 g/dl solution in a 96% sulfuric acid. When the relative viscosity is lower than 1.8, the layered silicate (smectite) tends to easily aggregate in a shaped article of polyamide resin to deteriorate the appearance of the products. A polyamide having a relative viscosity higher than 3.9 is difficult to produce because of the production limitation. By regulating the relative viscosity within the range of 1.8 to 3.9, the dispersibility of the clay mineral (smectite) is enhanced because the resins are subject to moderate pressure during the kneading and extruding operations, and the regulation of the width of films and sheets become easy because the neck-in occurs scarcely when extruded from a T-die extruder.

The relative viscosity referred to herein is a ratio represented by the following formula:

$$\text{Relative Viscosity}=t/t_0$$

wherein t is a falling time of a solution of 1 g of a resin in 100 cc (1 dl) of 96% sulfuric acid, $t_0$ is a falling time of 96% sulfuric acid, each measured at 25° C. by Cannon-Fenske viscometer.

The water content of the polyamide resin A is preferably less than 0.2%. A water content of 0.2% or more is undesirable because the dispersibility of smectite is lowered and the decrease in molecular weight and the formation of gel-like particles are likely to occur.

The smectite B is a dioctahedral or trioctahedral layered silicate having a charge density of 0.25 to 0.6. The dioctahedral layered silicate includes montmorillonite, beidellite, etc., and the trioctahedral layered silicate includes hectorite, saponite, etc.

The smectite B is preferably a layered silicate treated with an organic swelling agent of polymer type or organic compound type to increase the interlayer distance of the layered silicate. The content of the organic swelling agent in the smectite B is preferably 20 to 50% by weight. If less than 20% by weight, the dispersibility of the smectite is lowered, and an excessive organic swelling agent may increase the haze and spoil the appearance if exceeding 50% by weight.

Examples of the organic swelling agent is preferably a quaternary ammonium salt, more preferably a quaternary ammonium salt having at least one alkyl or alkenyl group having 12 or more carbon atoms.

Specific examples of the organic swelling agent include a trimethylalkylammonium salt such as trimethyldodecylammonium salt, trimethyltetradecylammonium salt, trimethylhexadecylammonium salt, trimethyloctadecylammonium salt, and trimethyleicosylammonium salt; a trimethylalkenylammonium salt such as trimethyloctadecenylammonium salt and trimethyloctadecadienylammonium salt; a triethylalkylammonium salt such as triethyldodecylammonium salt, triethyltetradecylammonium salt, triethylhexadecylammonium salt, and triethyloctadecylammonium salt; a tributylalkylammonium salt such as tributyldodecylammonium salt, tributyltetradecylammonium salt, tributylhexadecylammonium salt, and tributyloctadecylammonium salt; a dimethyldialkylammonium salt such as dimethyldidodecylammonium salt, dimethylditetradecylammonium salt, dimethyldihexadecylammonium salt, dimethyldioctadecylammonium salt, and dimethylditallowammonium salt; a dimethyldialkenylammonium salt such as dimethyldioctadecenylammonium salt and dimethyldioctadecadienylammonium salt; a diethyldialkylammonium salt such as diethyldidodecylammonium salt, diethylditetradecylammonium salt, diethyldihexadecylammonium salt, and diethyldioctadecylammonium salt; a dibutyldialkylammonium salt such as dibutyldidodecylammonium salt, dibutylditetradecylammonium salt, dibutyldihexadecylammonium salt, and dibutyldioctadecylammonium salt; a methylbenzyldialkylammonium salt such as methylbenzyldihexadecylammonium salt; a dibenzyldialkylammonium salt such as dibenzyldihexadecylammonium salt; a trialkylmethylammonium salt such as tridodecylmethylammonium salt, tritetradecylmethylammonium salt, and trioctadecylmethylammonium salt; a trialkylethylammonium salt such as tridodecylethylammonium salt; a trialkylbutylammonium salt such as tridodecylbutylammonium salt; and an ω-amino acid such as 4-amino-n-butylic acid, 6-amino-n-caproic acid, 8-aminocaprylic acid, 10-aminodecanoic acid, 12-aminododecanoic acid, 14-aminotetradecanoic acid, 16-aminohexadecanoic acid, and 18-aminooctadecanoic acid. In addition, also usable as the organic swelling agent is an ammonium salt having a hydroxyl group and/or an ether group, for example, a quaternary ammonium salt having at least one alkylene glycol residue such as methyldialkyl(PAG)ammonium salt, ethyldialkyl(PAG)ammonium salt, butyldialkyl(PAG)ammonium salt, dimethylbis(PAG)ammonium salt, diethylbis (PAG)ammonium salt, dibutylbis(PAG)ammonium salt, methylalkylbis(PAG)ammonium salt, ethylalkylbis(PAG)ammonium salt, butylalkylbis(PAG)ammonium salt, methyltri(PAG)ammonium salt, ethyltri(PAG)ammonium salt, butyltri(PAG)ammonium salt, and tetra(PAG)ammonium salt, wherein alkyl is a $C_{12}$ or more alkyl such as dodecyl, tetradecyl, hexadecyl, octadecyl, and eicosyl, and PAG is a polyalkylene glycol residue, preferably polyethylene glycol residue or polypropylene residue having 20 or less carbon atoms. Of the above, preferred are trimethyldodecylammonium salt, trimethyltetradecylammonium salt, trimethylhexadecylammonium salt, trimethyloctadecylammonium salt, dimethyldidodecylammonium salt, dimethylditetradecylammonium salt, dimethyldihexadecylammonium salt, dimethyldioctadecylammonium salt, and dimethylditallowammonium salt. These organic swelling agents may be used alone or in combination of two or more.

The content of the smectite B in the polyamide resin composition is preferably 0.5 to 8% by weight, and more preferably 1.0 to 5% by weight. The improvement in the gas-barrier properties can be obtained in a content of 0.5% by weight or higher. The clarity of the shaped article is not lowered when the content is 8% by weight or lower. The addition of the smectite B exceeding 8% by weight produces no additional improvement in the gas-barrier properties. The heating residue of the smectite B is preferably 0.25 to 6.4% by weight, more preferably 0.5 to 5% by weight, when measured after placed in an electric furnace at 800° C. for 5 h.

The smectite B should be uniformly dispersed throughout the polyamide resin A without locally condensed. The words "uniform dispersion" referred to herein mean that the smectite is separated into flat layers in the polyamide resin and 50% or more of the separated layers have a interlayer distance of 5 nm or more. The interlayer distance means the distance between the gravity centers of adjacent pair of the separated flat layers. The larger the interlayer distance, the layered silicate is dispersed more uniformly to provides final film, sheet or hollow container which has a good appearance such as a high clarity and enhanced gas-barrier properties against oxygen, carbon dioxide, etc.

The incorporation of the smectite B to the polyamide resin A is generally performed by adding the smectite B under stirring during the melt polymerization for producing the polyamide resin, or by melt-kneading the polyamide resin A and the smectite B in various usual extruders such as a single or twin screw extruder. The melt kneading in a twin screw extruder is preferable in view of the productivity, its general use, etc.

For example, the melt-kneading of the polyamide resin A and the smectite B in a twin screw extruder is conducted at a melt-kneading temperature from around the melting point of the polyamide resin A to the melting point +60° C. with a residence time in the extruder as shorter as possible. The portion for mixing the polyamide resin A and the smectite B of the screw mounted in an extruder is preferably constructed from a reverse screw element, a kneading disc, etc., because the smectite B is efficiently dispersed throught the polyamide A.

The oxygen permeability of the shaped article such as film and sheet produced from the resin composition of the present invention is preferably less than 0.6 ml·mm/m$^2$·day·MPa, more preferably less than 0.5 ml·mm/m$^2$·day·MPa when measured at 23° C. and 60% relative humidity. Thus, being excellent in the gas-barrier properties, the polyamide resin shaped article of the present invention is suitable as the packaging materials which are required to have high gas-barrier properties against various gas such as oxygen, carbon dioxide, gasoline and aromatic gas.

The polyamide resin composition of the present invention is made into a shaped article such as non-stretched film, stretched film, multilayer film, multilayer stretched film, sheet, multilayer sheet, paper-laminated body, (multilayer) hollow container such as bottle, cup, tray, tube and tank, connector, cap, or valve. Although not specifically limited, these shaped articles are preferably produced by a melt molding method such as a T-die extrusion, an injection blow molding, a co-extrusion blow molding, an injection molding and a multilayer injection molding. For example, a non-stretched film or sheet may be produced by using a T-die extruder. The non-stretched sheet or film is stretched in the machine direction and/or the transverse direction to produce a stretched film, or deep-drawn into cups, trays, etc. Bottles, tanks can be produced by blow-molding a (multilayer) tubular parison which is formed using an injection molding machine or an extruder. The multilayer injection molding include, but not limited thereto, a two-color molding, an insert molding, and a co-injection molding. A recycle layer may be provided to a multilayer film and a multilayer container.

The polyamide resin shaped article of the present invention may contain another resin such as nylon 6, nylon 66, nylon 6,66, polyester, polyolefin and modified polyolefin as far as the object of the present invention is not lost. In addition, the polyamide resin shaped article of the present invention may further contain an additive. Examples of such an additive include an inorganic filler such as glass fiber and carbon fiber; a flat inorganic filler such as glass flake, talc, kaolin and mica; an impact modifier such as elastomers; a nucleating agent; a lubricant such as amides of fatty acids and metal salts of fatty acids; an antioxidant such as copper compounds, organic or inorganic halogen compounds, hindered phenols, hindered amines, hydrazines, sulfur compounds, and phosphorus compounds; a heat stabilizer; an anti-coloring agent; an ultraviolet absorber; a releasing agent; a plasticizer; a coloring agent; and a fire retardant.

The polyamide resin composition or shaped article of the present invention is preferably produced by a master batch method where a smectite-rich resin composition is first prepared, and then the solid smectite-rich resin composition and the solid polyamide A are mixed and molded by a T-die extruder or a injection molding machine.

The present invention will be described more in detail by reference to the following examples, which are not intended to restrict the scope of the present invention thereto. In the following examples, the polyamide shaped articles were evaluated by the following methods.

Terminal Amino Concentration of Polyamide Resin

Accurately weighed 0.3 to 0.5 g of polyamide resin was dissolved under stirring in 30 cc of a phenol/ethanol (4/1 by volume) solvent at 20 to 30° C. After completely dissolved, the solution was titrated by a N/100 hydrochloric acid using an automatic titration apparatus manufactured by Mitsubishi Chemical Corporation. The terminal amino concentration was calculated from the titration results.

Relative Viscosity of Polyamide Resin

Accurately weighed one gram of polyamide resin was dissolved in 100 cc of 96% sulfuric acid under stirring at 20 to 30° C. Immediately after completing the dissolution, 5 cc of the solution was introduced into Cannon-Fenske viscometer, which was allowed to stand for 10 min in a thermostatic chamber held at 25±0.03° C., and then the falling time t was measured. Similarly, the falling time $t_0$ of the 96% sulfuric acid was measured. The relative viscosity was calculated from the following formula:

Relative Viscosity=$t/t_0$

Water Content

Measured in nitrogen atmosphere at 23° C. for 50 min, using a trace water analyzer CA-05 manufactured by Mitsubishi Chemical Corporation.

Oxygen Permeability

Using OX-TRAN 10/50A manufactured by Modern Control Co., Ltd., the oxygen permeability of a non-stretched film was measured according to ASTM D3985 at 23° C. and 60% relative humidity.

Clarity

Using a color difference/turbidity meter COH-300A manufactured by Nippon Denshoku Kogyo Co., Ltd., the haze of a non-stretched film was measured according to ASTM D1003.

Aggregates and Gel-like Particles

The presence of the aggregates and gel-like particles (hereinafter collectively referred to as "aggregates, etc.") was visually observed on a non-stretched film.
- A: Not remarkable (small amount of aggregates, etc./small size)
- B: Not so noticeable (large amount of aggregates, etc./small size)
- C: Considerably remarkable (large amount of aggregates, etc./large size)

In the examples and comparative examples, the following layered silicates were used.
1. Montmorillonite 1: ORBEN (trade name) available from Shiraishi Kogyo Co., Ltd., containing, as the organic swelling agent, 34% by weight of trimethyloctadecylammonium salt.
2. Montmorillonite 2: NEW-D ORBEN (trade name) available from Shiraishi Kogyo Co., Ltd., containing, as the organic swelling agent, 42% by weight of dimethyldioctadecylammonium salt.
3. Synthetic mica: SOMASIF (trade name) available from Corp Chemical Co., Ltd., containing, as the organic swelling agent, 42% by weight of a quaternary ammonium salt.
4. Synthetic smectite: LUCENTITE SWF (trade name) available from Corp Chemical Co., Ltd., with no organic swelling agent.

PREPARATION EXAMPLE 1

Polyamide Resin MXD6 (A1)

Into a jacketed 50-L reaction vessel equipped with a stirring device, a partial condenser, a cooler, a dropping funnel, and a nitrogen inlet, 10 kg of adipic acid was introduced. After sufficiently replacing the inner atmosphere with nitrogen, adipic acid was uniformly melted at 160° C. under a slight nitrogen stream. To the molten adipic acid, 9.29 kg of m-xylylenediamine was continuously added dropwise under stirring over 170 min. During the addition, the inner temperature was continuously raised to 245° C. The water distilled off with the addition of m-xylylenediamine was removed from the reaction system through the partial condenser and the cooler. After completing the addition of m-xylylenediamine, the inner temperature was raised to 260° C. and the reaction was continued for one hour. The resultant polymer was taken out in the form of strand from the nozzle at the lower portion of the reaction vessel, cooled by water, and cut to pellets to obtain melt-polymerized poly(m-xylylene diadipamide). The pellets of poly(m-xylylene diadipamide) were placed into a 250-L solid-phase polymerizer which was then rotated at 18 rpm. The polymerizer was evacuated to 5 Torr, and then returned to ordinary pressure by nitrogen of 99% by volume purity. This operation was repeated three times. Then, the temperature was raised from room temperature to 140° C. When the pellet temperature reached 140° C., the evacuation was started and the temperature was further raised. After 110 min from starting the evacuation, the pellet temperature reached 200° C. and the heating was stopped. The polymerizer was returned to ordinary pressure by introducing nitrogen to obtain the polyamide resin MXD6 (A1) having a terminal amino concentration of 27 μeq/g, a relative viscosity of 2.6, and a water content of 0.07%.

PREPARATION EXAMPLE 2

Polyamide Resin MXD6 (A2)

In the same manner as in Preparation Example 1 except for changing the addition amount of m-xylylenediamine to 9.31 kg, the polyamide resin MXD6 (A2) was obtained.

PREPARATION EXAMPLE 3

Polyamide Resin MXD6 (A3)

In the same manner as in Preparation Example 1 except for changing the addition amount of m-xylylenediamine to 9.38 kg, the polyamide resin MXD6 (A3) was obtained.

PREPARATION EXAMPLE 4

Polyamide Resin MXD6 (A4)

In the same manner as in Preparation Example 1 except for changing the addition amount of m-xylylenediamine to 9.26 kg and omitting the solid-phase polymerization, the melt-polymerized polyamide resin MXD6 (A4) was obtained.

PREPARATION EXAMPLE 5

Polyamide Resin MXD6 (A5)

By immersing the polyamide resin MXD6 (A1) in 23° C. water for one week, the polyamide resin MXD6 (A5) was obtained.

The properties of the polyamide resins are shown in Table 1.

TABLE 1

| | Polyamide Resin MXD6 | | | | |
|---|---|---|---|---|---|
| | A1 | A2 | A3 | A4 | A5 |
| Terminal amino concentration (μeq/g) | 27 | 15 | 77 | 42 | 27 |
| Terminal carboxyl concentration (μeq/g) | 56 | 24 | 27 | 88 | 56 |
| Reaction molar ratio | 0.997 | 0.999 | 1.006 | 0.994 | 0.997 |
| Relative viscosity (ηr) | 2.6 | 3.8 | 2.5 | 2.1 | 2.6 |
| Water content (%) | 0.07 | 0.04 | 0.07 | 0.14 | 1.6 |

EXAMPLE 1

A dry blend of 97 parts by weight of polyamide resin MXD6 (A1) and 3 parts by weight of montmorillonite 1 (ORBEN (trade name) available from Shiraishi Kogyo Co., Ltd.) was fed into an intensive twin screw extruder having a 37 mm cylinder and a dwelling portion made by a reverse element through a metering feeder at a rate of 12 kg/h. After melt-kneading under conditions of 270° C. cylinder temperature, 500 rpm screw rotation and 75-second residence time, the kneaded melt was extruded into a molten strand, which was then solidified by cooling air and pelletized.

The pellets obtained above were fed to a T-die twin screw extruder with 20-mm cylinder through a metering feeder at a rate of 1.2 kg/h. After melt-kneading under conditions of 260° C. cylinder temperature, 100-rpm screw rotation and two-minute residence time, the kneaded melt was extruded through the T-die into film form which was solidified on a cooling roll of 70° C. while taken off at a rate of 2.7 m/min to obtain a non-stretched film of 50 μm thick. The evaluation results of the non-stretched film are shown in Table 1.

EXAMPLES 2 AND 3

In the same manner as in Example 1 except for changing the addition amount of the layered silicate for preparing the polyamide resin composition and using a polyamide resin with different properties, each film was produced. The evaluation results of the non-stretched film are shown in Table 1.

EXAMPLE 4

In the same manner as in Example 1 except for changing the layered silicate to montmorillonite 2 (NEW-D ORBEN (trade name) available from Shiraishi Kogyo Co., Ltd.) and changing the melt-kneading conditions in the twin screw extruder to a feeding rate of 6 kg/h, a cylinder temperature of 240 to 250° C. and a residence time of 110 sec. The evaluation results of the non-stretched film are shown in Table 2.

EXAMPLES 5, 6 AND 7

In the same manner as in Example 1 except for changing the addition amount of the layered silicate for preparing the polyamide resin composition and using a polyamide resin with different properties, each film was produced. The evaluation results of the non-stretched film are shown in Tables 3 and 4.

TABLE 2

|  | Examples | | | |
|---|---|---|---|---|
|  | 1 | 2 | 3 | 4 |
| Formulation of polyamide resin composition | | | | |
| MXD6 (A1) | 97 | 95 | — | 97 |
| MXD6 (A2) | — | — | 97 | — |
| montmorillonite 1 | 3 | 5 | 3 | — |
| montmorillonite 2 | — | — | — | 3 |
| Evaluation results | | | | |
| film thickness (μm) | 50 | 50 | 50 | 50 |
| gas barrier properties | | | | |
| oxygen permeability (ml · mm/m² · day · MPa) | 0.4 | 0.3 | 0.4 | 0.4 |
| appearance | | | | |
| haze value (%) | 0.6 | 1.1 | 0.5 | 1.7 |
| aggregates, etc. | A | A | A | A |

TABLE 3

|  | Examples | |
|---|---|---|
|  | 5 | 6 |
| Formulation of polyamide resin composition | | |
| MXD6 (A4) | — | 97 |
| MXD6 (A5) | 97 | — |
| montmorillonite 1 | 3 | 3 |
| Evaluation results | | |
| film thickness (μm) | 50 | 50 |
| gas barrier properties | | |
| oxygen permeability (ml · mm/m² day · MPa) | 0.5 | 0.4 |
| appearance | | |
| haze value (%) | 4.0 | 1.3 |
| aggregates, etc. | B | B |

COMPARATIVE EXAMPLES 1 AND 2

In the same manner as in Example 1 except for using a polyamide resin with different properties and changing the kind and addition amount of the layered silicate in the preparation of the polyamide resin composition, each film was produced. The evaluation results of the non-stretched film are shown in Tables 4 and 5.

COMPARATIVE EXAMPLES 3 AND 4

In the same manner as in Example 4 except for using a polyamide resin with different properties and changing the kind and addition amount of the layered silicate in the preparation of the polyamide resin composition, each film was produced. The evaluation results of the non-stretched film are shown in Tables 4 and 5.

TABLE 4

|  | Example | Comparative Examples | |
|---|---|---|---|
|  | 7 | 1 | 3 |
| Formulation of polyamide resin composition | | | |
| MXD6 (A1) | 99.4 | — | — |
| MXD6 (A3) | — | 97 | 97 |
| montmorillonite 1 | 0.6 | 3 | — |
| montmorillonite 2 | — | — | 3 |
| Evaluation results | | | |
| film thickness (μm) | 50 | 50 | 50 |
| gas barrier properties | | | |
| oxygen permeability (ml · mm/m² · day · MPa) | 0.6 | 0.4 | 0.4 |
| appearance | | | |
| haze value (%) | 1.0 | 4.1 | 6.5 |
| aggregates, etc. | A | A | A |

TABLE 5

|  | Comparative Examples | |
|---|---|---|
|  | 2 | 4 |
| Formulation of polyamide resin composition | | |
| MXD6 (A1) | 99.8 | 90 |
| montmorillonite 1 | 0.2 | — |
| montmorillonite 2 | — | 10 |
| Evaluation results | | |
| film thickness (μm) | 50 | 50 |
| gas barrier properties | | |
| oxygen permeability (ml · mm/m² day · MPa) | 0.7 | 0.3 |
| appearance | | |
| haze value (%) | 0.8 | 19 |
| aggregates, etc. | A | C |

COMPARATIVE EXAMPLES 5 AND 6

In the same manner as in Example 1 except for changing the kind of the layered silicate in the preparation of the polyamide resin composition, each film was produced. The evaluation results of the non-stretched film are shown in Table 6.

COMPARATIVE EXAMPLE 7

In the same manner as in Example 1 except for using only polyamide MXD6 without using montmorillonite 1, a non-stretched film was produced. The evaluation results of the non-stretched film are shown in Table 6.

TABLE 6

|  | Comparative Examples | | |
|---|---|---|---|
|  | 5 | 6 | 7 |
| Formulation of polyamide resin composition | | | |
| MXD6 (A1) | 97 | 97 | 100 |
| synthetic mica | 3 | — | — |
| synthetic smectite | — | 3 | — |
| Evaluation results | | | |
| film thickness (μm) | 50 | 50 | 50 |

TABLE 6-continued

|  | Comparative Examples | | |
|---|---|---|---|
|  | 5 | 6 | 7 |
| gas barrier properties | | | |
| oxygen permeability (ml · mm/m² · day · MPa) | 0.8 | 1.2 | 0.9 |
| appearance | | | |
| haze (%) | 6.4 | 30 | 1.0 |
| aggregates, etc. | C | C | C |

As described above, the polyamide resin composition of the present invention is suitable as a packaging material for foods, beverages, medicines, electric parts, etc. because of its excellent clarity, appearance and gas barrier properties, and its stable properties.

What is claimed is:

1. A polyamide resin composition comprising:
   (A) 95 to 99.0 parts by weight of a polyamide resin produced by the polycondensation of a diamine component containing 70 mol % or more of m-xylylenediamine and a dicarboxylic acid component containing 70 mol % or more of a straight-chain, aliphatic α,ω-dicarboxylic acid having 4 to 20 carbon atoms; and
   (B) 5 to 1.0 part by weight of a smectite treated with an organic swelling agent,
   the polyamide resin A meeting the requirements of (1) a terminal amino concentration of 5 to 50 μeq/g, (2) a reaction molar ratio of 0.998–0.992 when defined by a molar ratio of reacted diamine to reacted dicarboxylic acid, (3) a relative viscosity of 2.4 to 3.7 when measured at 25° C. on a 1 g/dl solution in a 96% sulfuric acid, and (4) a water content of less than 0.2%,
   wherein the content of the organic swelling agent in the smectite B is 20 to 50% by weight and said swelling agent is a quaternary ammonium salt having at least one alkyl or alkenyl group having 12 or more carbon atoms.

2. The polyamide resin composition according to claim 1, wherein the smectite B is montmorillonite.

3. The polyamide resin composition according to claim 1, wherein the smectite B is separated into flat layers in the polyamide resin A and 50% or more of the separated layers has an interlayer distance of 5 nm or more.

4. A shaped article comprising the polyamide resin composition as defined in claim 1.

5. The shaped article according to claim 4, having an oxygen permeability of less than 0.6 ml·mm/m²·day·MPa at 23° C. under 60% relative humidity.

* * * * *